US008999157B2

United States Patent
Andersson et al.

(10) Patent No.: US 8,999,157 B2
(45) Date of Patent: Apr. 7, 2015

(54) METHOD FOR PREPARATION OF A BIOMOLECULE ADSORBENT

(75) Inventors: Lars C. Andersson, Uppsala (SE); Anna Arefalk, Uppsala (SE); Ola Lind, Uppsala (SE); Bjorn Noren, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 844 days.

(21) Appl. No.: 12/665,950

(22) PCT Filed: Jul. 7, 2008

(86) PCT No.: PCT/SE2008/000436
§ 371 (c)(1),
(2), (4) Date: Dec. 22, 2009

(87) PCT Pub. No.: WO2009/008802
PCT Pub. Date: Jan. 15, 2009

(65) Prior Publication Data
US 2011/0003941 A1    Jan. 6, 2011

(30) Foreign Application Priority Data
Jul. 9, 2007    (SE) ...................................... 0701682

(51) Int. Cl.
*B01J 20/32*    (2006.01)
*B01D 15/38*    (2006.01)
*B01J 20/289*    (2006.01)

(52) U.S. Cl.
CPC ......... *B01J 20/3242* (2013.01); *B01D 15/3828* (2013.01); *B01J 20/289* (2013.01); *B01J 20/3219* (2013.01); *B01J 20/3251* (2013.01); *B01J 20/3265* (2013.01)

(58) Field of Classification Search
CPC  B01D 15/3828; B01J 20/289; B01J 20/3219; B01J 20/3242; B01J 20/3251
USPC ................... 210/656, 635, 659, 198.2, 502.1; 502/401, 439
See application file for complete search history.

(56) References Cited

U.S. PATENT DOCUMENTS

| | | | |
|---|---|---|---|
| 4,877,830 A | 10/1989 | Dobeli et al. | |
| 5,866,006 A * | 2/1999 | Lihme et al. | 210/635 |
| 6,441,146 B1 | 8/2002 | Minh | |
| 6,692,643 B2 * | 2/2004 | Sulkowski et al. | 210/635 |
| 6,783,672 B2 * | 8/2004 | Tubbs et al. | 210/198.2 |
| 6,872,317 B1 * | 3/2005 | Nambu et al. | 210/679 |
| 2002/0094566 A1 | 7/2002 | Tubbs et al. | |
| 2003/0157084 A1 | 8/2003 | Jakobsson et al. | |

FOREIGN PATENT DOCUMENTS

| | | |
|---|---|---|
| EP | 1 244 612 | 8/2005 |
| WO | WO 97/14413 | 4/1997 |
| WO | WO 2004/104023 | 12/2004 |
| WO | WO 2006/056443 | 6/2006 |

OTHER PUBLICATIONS

Haner, M., et al., Analytical Biochemistry, 138:229-234 (1984).
Hochuli, E., Journal of Chromatography, 411:177-184 (1987).
Mccurley, M., et al., Talanta, 36(1/2):341-346 (1989).
Porath, J., et al., Nature, 258:598-599 (1975).
Abstract of CN 1966088 date May 2007.
Haner, M., et al., Analytical Biochemistry, 138(1), 1984, 229-234.
Patchornik, G., Bioconjugate Chemistry, 19(3), 2008, 673-679.

* cited by examiner

*Primary Examiner* — Ernest G Therkorn
(74) *Attorney, Agent, or Firm* — Sutherland Asbill & Brennan LLP

(57) ABSTRACT

The present invention is relates to method for production of a biomolecule adsorbent with a pentadentate ligand with very strong chelating properties, and to methods for use thereof for, for example, protein purification, detection or binding. The biomolecule adsorbent comprises the formula:

$$Q-S-L-N\left(\begin{array}{c}X\\X\end{array}\right)-\left[CH_2\right]_n-N\left(\begin{array}{c}X\\X\end{array}\right)$$

wherein Q is a carrier, S is a spacer, L is an amide linkage, X is COOH, and n=2 or 3.

8 Claims, No Drawings

US 8,999,157 B2

METHOD FOR PREPARATION OF A BIOMOLECULE ADSORBENT

CROSS-REFERENCE TO RELATED APPLICATIONS

This application is a filing under 35 U.S.C. §371 and claims priority to international patent application number PCT/SE2008/000436 filed Jul. 7, 2008, published on Jan. 15, 2009, as WO 2009/008802, which claims priority to patent application number 0701682-7 filed in Sweden on Jul. 9, 2007.

FIELD OF THE INVENTION

The present invention relates to the field of biomolecule purification, detection and/or binding, and more specifically to a method for preparation of a biomolecule adsorbent with a pentadentate ligand, as well as to uses thereof.

BACKGROUND OF THE INVENTION

Immobilized metal chelate chromatography (IMAC) has been used as a technique for protein purification for several years. The principle behind IMAC lies in the fact that many transition metal ions can form coordination bonds between oxygen and nitrogen atoms of amino acid side chains in general and of histidine, cysteine, and tryptophan, in particular. To utilise this interaction for chromatographic purposes, the metal ion must be immobilised onto an insoluble carrier. This can be done by attaching a chelating ligand to the carrier. Most importantly, to be useful, the metal ion of choice must have a significantly higher affinity for the chelating ligand than for the compounds to be purified. Examples of suitable coordinating metal ions are Cu(II), Zn(II), Ni(II), Ca(II), Co(II), Mg(II), Fe(III), Al(III), Ga(III), Sc(III) etc. Various chelating groups are known for use in IMAC, such as iminodiacetic acid (IDA) (Porath et al. *Nature*, 258, 598-599, 1975), which is a tridentate chelator, and nitrilotriacetic acid (NTA) (Hochuli et al., *J. Chromatography* 411, 177-184, 1987), which is a tetradentate chelator.

In the field of IMAC much effort has been placed on providing an adsorbent with a high adsorption capacity for recombinant target proteins, e.g. proteins which contain extra histidine residues, so called histidine-tagged proteins. However, the cells and the fermentation broth wherein the recombinant target protein is produced will also contain other proteins produced by the host cell, generally denoted host cell proteins, some of which will also bind to the adsorbent. Thus, there is a need in this field of an IMAC adsorbent, which adsorbs less host cell proteins and/or which presents an improved selectivity allowing selective binding and/or elution of target proteins.

There are several potential advantages that in theory could be attributed to pentadentate chelating ligands. All protein binding to the metal ion should be weakened compared to tri- and tetra-dentate ligands since the number of coordination sites available for a protein molecule is lower, to the extent that most non-tagged proteins may not bind, leading to higher selectivity for histidine-tagged proteins. This could be of particular importance for low-level target protein expression, where competitive displacement of weak, unwanted binders by the strongest binder, namely the histidine-tagged protein, is difficult to use to an advantage at purification. Furthermore, the stronger binding of metal ions will decrease the loss of the ions during chromatography, decrease the risk for contamination of the purified protein with traces of metal ions, and make the chromatography resin reusable without the need for re-charging of metal ions before the next use. Such aspects are especially important for feeds (samples applied to the chromatographic column) like animal cell culture media and buffers that are "aggressive", i.e., that tend to remove the immobilized metal ions. Also when substances that disturb the purification by interacting with the metal ions are present in feeds and/or buffers, e.g. some disulfide-reducing agents, it should be an advantage to use IMAC resins that have a pentadentate chelator.

U.S. Pat. No. 6,441,146 (Minh) relates to pentadentate chelator resins, which are metal chelate resins capable of forming octahedral complexes with polyvalent metal ions with five coordination sites occupied by the chelator, leaving one coordination site free for interaction with target proteins. It is suggested to use the disclosed chelator resins as universal supports for immobilizing covalently all proteins, using a soluble carbodiimide. More specifically, the disclosed pentadentate chelator resin is prepared by first reacting lysine with a carrier, such as activated SEPHAROSE™. The resulting immobilized lysine is then carboxylated into a pentadentate ligand by reaction with bromoacetic acid.

McCurley & Seitz (Talanta [1989] 36, 341-346: "On the nature of immobilized tris(carboxymethyl)ethylenediamine") relates to immobilized pentadentate chelator, namely tris(carboxymethyl)ethylenediamine, also known as TED, used as IMAC stationary phases for protein fractionation. The TED resins were obtained by immobilization of ethylene diamine to a carbohydrate support, and subsequent carboxylation to provide the chelating carboxylic groups. The experimental evidence in the article shows that TED-resins prepared accordingly appear to have a mixture of ligands, with ethylenediamine-N,N'-diacetic acid (EDDA), not TED, predominant. The article also reports a large discrepancy between theoretical metal ion binding capacity determined from the nitrogen content and the experimental capacities, which indicate that a large proportion of the ligands are in a form that does not bind metal ions.

EP 1 244 612 (Akzo Nobel) relates to a process of preparing alkylene diamine triacetic acid and derivatives thereof. More specifically, a process is disclosed, which comprises the conversion of alkylene diamine to a salt of alkylene diamine triacetic acid wherein the reaction is carried out in the presence of a polyvalent metal ion and the entire reaction is carried out under hydrolyzing conditions if any of the reactants contain or form nitrile or amide groups. The suggested use of these compounds is in the field of chelating chemistry, such as metal cleaning.

Haner et al., *Analytical Biochemistry* 138, 229-234 (1984), describe pentadentate chelator resins produced by linking EDTA covalently to amino-agarose. A cobalt complex of EDTA is used for coupling to the polymer resin via carbodiimide linkage. The described use of the resins was the removal of unwanted $Ca^{2+}$ ions.

BRIEF DESCRIPTION OF THE INVENTION

The present invention provides an easy, rapid and relatively inexpensive method for preparation of a biomolecule adsorbent with a pentadentate ligand. The ligand forms very stable metal chelates, which at the same time provide highly selective binding properties for certain polypeptides or proteins in purification and/or detection processes.

Compared to prior art, the synthesis according to the invention is simple, has a high yield, requires no activation of the ligand precursor (e.g. carbodiimide-activation of EDTA's carboxyl groups), requires no deprotection or derivatisation of the coupled ligand (e.g. carboxylation) and provides a dominating single-point attachment of the chelating ligand (excess dianhydride used) through a stable amide-linkage.

Thus, in a first aspect, the invention relates to a method of preparing a biomolecule adsorbent, comprising the steps of providing an alkylene diamine tetraacetic acid dianhydride, and coupling thereof to a carrier to form ligands comprised of alkylene diamine triacetic acid linked to said carrier via an amide linkage and a spacer, and the further step of charging the adsorbent so obtained with metal ions selected from the group that consists of $Cu^{2+}$, $Ni^{2+}$, $Zn^{2+}$, $Co^{2+}$, $Fe^{3+}$ and $Ga^{3+}$.

The alkylene diamine tetraacetic acid dianhydride is preferably ethylene diamine tetraacetic acid (EDTA) dianhydride. Alternatively the alkylene diamine tetraacetic acid dianhydride is propylene diamine tetraacetic acid dianhydride.

A biomolecule adsorbent produced by the method of the invention has the following formula:

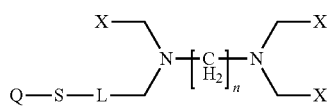

wherein
Q is a carrier
S is a spacer
L is an amide linkage
X is COOH
n=2-3.

The carrier Q may comprise any natural or synthetic polymer. The carrier Q may be porous or non-porous, and made from any suitable material. In one embodiment, the carrier is comprised of a cross-linked carbohydrate material, such as agarose, agar, cellulose, dextran, chitosan, konjac, carrageenan, gellan, alginate etc. The support is easily prepared according to standard methods, such as inverse suspension gelation, or obtained as a commercially available product. Carbohydrate carriers, such as agarose, are commonly amino activated before coupling of ligands thereon. The amino activation can be carried out following standard procedures. Thus, in one embodiment of the present method, the carrier is a carbohydrate carrier, which has been amino activated before the coupling reaction.

Alternatively, the carrier Q is comprised of cross-linked synthetic polymers, such as styrene or styrene derivatives, divinylbenzene, acrylamides, acrylate esters, methacrylate esters, vinyl esters, vinyl amides etc. Such carriers will commonly present residual vinyl groups available for amino activation. In the formula, n is 2 or 3, preferably 2, i.e. ethylene.

The spacer should preferably be a hydrophilic chain of C and O comprising at least 3 atoms.

In a preferred embodiment, Q is amino-activated agarose, and n is 2, i.e. ethylene.

In an alternative embodiment of the biomolecule adsorbent, Q may comprise magnetic particles. This is especially useful for sample preparation formats for capturing of, for example, phosphoproteins.

In a second aspect, the invention relates to use of the biomolecule adsorbent described above for adsorbing metal ions. In further aspects, the invention relates to purification and/or detection and/or binding of biomolecules, such as proteins, peptides and/or polynucleotides. In one embodiment the biomolecule is a membrane protein. In another embodiment the biomolecule is phosphorylated.

Preferably the biomolecule comprises two or more histidine, tryptophan and/or cysteine residues. Most preferably, the biomolecule is labelled with at least two His-residues. If the biomolecule is a recombinant protein, the labelling is done at the genetic level.

Preferably, the biomolecule adsorbent is used as an immobilised metal ion affinity chromatography (IMAC) adsorbent. The protein or polypeptide to be purified or detected comprises two or more histidine, tryptophan and/or cysteine residues. The His-residues may be natural or the protein or polypeptide may be labelled (at the DNA or protein level) with at least two, preferably at least six, His-residues.

Further aspects and advantages of the present invention will appear from the detailed description and examples below.

DETAILED DESCRIPTION OF THE INVENTION

The invention will be described more closely below in association with some non-limiting examples.

The biomolecule adsorbent with a pentadentate ligand of the present invention is preferably prepared by coupling of EDTA dianhydride to an amino activated carrier, via one of the dianhydride groups, obtaining a homogeneous product. The amide bond formed in the coupling appears to have a significant impact on the stability of the metal chelates formed from these adsorbents and, hence, the risk for metal ion leakage is highly reduced compared to prior art products. Amide bonds are known to have some affinity to metals, which is probably the reason for the enhanced chelating properties. This very strong chelation also results in a positive effect on the binding specificity when the present invention is used for the separation or purification of proteins or polypeptides.

The coupling of EDTA dianhydride to a primary amine on a solid carrier can be carried out under standard reaction conditions, using an excess of dianhydride to avoid cross-linking. After the coupling, the remaining anhydrides are hydrolyzed into carboxylic acids.

Thus, in one embodiment of the method according to the invention, the IMAC ligand precursors are commercially available. Accordingly, one advantage of the invention is that it avoids deprotection and/or carboxylation on a solid phase, which is a solid phase chemistry likely to result in a less homogenous product than the invention. Additionally, the ligand precursor is obtained in an active form, resulting in relatively high coupling yields.

In order to prepare the biomolecule adsorbent so prepared for the use in IMAC, metal ions should be chelated to the ligands. Thus, the present method comprises a step of charging the adsorbent so obtained with metal ions. In a specific embodiment, the metal ions are selected from the group consisting of $Cu^{2+}$, $Ni^{2+}$, $Zn^{2+}$, $Co^{2+}$; $Fe^{3+}$ and $Ga^{3+}$. In an advantageous embodiment, the metal ions are $Ni^{2+}$.

EXAMPLES

The present example is provided for illustrative purposes only, and should not be construed as limiting the present invention as defined by the appended claims.

Example 1

Coupling of EDTA Dianhydride to Low-Substituted Amino-Activated SEPHAROSE™ 6 FF with a BPR Butane Spacer Amino activated (24 μmol/mL) SEPHAROSE™ 6 FF resin (5 mL, 0.12 mmol) was washed with $H_2O$ followed by dimethylformamide, DMF (5× gel volume, GV), sucked dry and placed into a Falcon tube together with DMF (5 mL) and $K_2CO_3$ (32 mg, 0.24 mmol). After 15 min of shaking, EDTA dianhydride (59 mg, 0.23 mmol) was added. The tube was then placed into a shaking table at 25° C. for 19 hours.

The resin was washed with DMF (3×GV), EtOH (3×GV) and finally with $H_2O$ (5×GV).

To hydrolyze remaining anhydride groups, the resin were slowly washed with 1M NaOH (5×GV) followed by $H_2O$ (>10×GV).

According to nitrogen elemental analysis, the ligand density on the obtained prototype was 18 µmol/mL resin.

$Ni^{2+}$-binding capacity measurement by frontal analysis: The prototype was packed in a chromatography column with a bed dimension of 55×5.0 mm (approximately 1 ml). The column was attached onto a chromatography system (ÄKTA™ 10×T, GE Healthcare). 5 mM $NiSO_4$ was eluted bypass through the UV cell (UV at 372 nm) at a flow-rate of 1 mL/min. The absorbance for 5 mM $NiSO_4$ was noted. The prototype column was eluted with 5 column volumes (CV) 20 mM Na-Phosphate+500 mM NaCl pH 7.4 and 5 column volumes MILLI-Q® water (Millipore Inc.) and then loaded with 30 mL 5 mM $NiSO_4$ at 1 mL/min. The breakthrough of Ni ions was monitored when reaching saturation and the so called Qb10% value (quantity bound at 10% of the absorbance of the 5 mM $NiSO_4$) was determined. After the $Ni^{2+}$ loading and removal of excess Ni ions, the resin was washed with 5 CV 100 mM EDTA+20 mM Na-phosphate+500 mM NaCl pH 7.4 and the pump was stopped for 2 hours. After 2 hours, further 20 CV of 100 mM EDTA+20 mM Na-phosphate+500 mM NaCl pH 7.4 was pumped through the column. The amount of $Ni^{2+}$ eluted with EDTA was determined by integrating the 372 nm UV peaks generated by the EDTA washings (before and after the 2 hour pump stop) and by using a calibration curve these peak areas could be recalculated to released amount of $Ni^{2+}$.

$Ni^{2+}$-binding capacity (Qb10%): 17 µmol/mL resin. Total amount of $Ni^{2+}$ in 100 mM EDTA eluate after 2 hours of incubation: 0.8 µmol/mL resin (=4.7% of the capacity). Notably, this very low Ni ion elution with EDTA (found in this analysis and the analyses in Examples 2 and 3) is a property not at all found for IMAC resins now commercially available.

Example 2

Coupling of EDTA Dianhydride to High-Substituted Amino-Activated SEPHAROSE™ 6 FF with a BPR Butane Spacer Amino activated (210 µmol/mL) SEPHAROSE™ 6 FF resin (10 mL, 2.1 mmol) was washed with $H_2O$ followed by DMF (5×GV), sucked dry and placed into a Falcon tube together with DMF (10 mL) and $K_2CO_3$ (0.67 g, 4.8 mmol). After 15 min of shaking, EDTA dianhydride (1.24 g, 4.8 mmol) was added. The tube was then placed into a shaking table at 25° C. for 21 hours.

The resin was washed with DMF (3×GV), EtOH (3×GV) and finally with $H_2O$ (5×GV).

To hydrolyze remaining anhydride groups, the resin were slowly washed with 1M NaOH (5×GV) followed by $H_2O$ (>10×GV).

According to nitrogen elemental analysis, the ligand density on the obtained prototype was 130 µmmol/mL resin.

$Ni^{2+}$-binding capacity measurement was conducted as described in Example 1. $Ni^{2+}$-binding capacity (Qb10%): 120 µmmol/mL resin. Total amount of $Ni^{2+}$ in 100 mM EDTA eluate after 2 hours of incubation: 1.3 µmmol/mL resin (=1.1% of the capacity).

Example 3

Coupling of EDTA Dianhydride to High-Substituted Amino-Activated SEPHAROSE™ 6 FF with an Epichlorohydrin Spacer Amino activated (160 µmol/mL) SEPHAROSE™ 6 FF resin (10 mL, 1.6 mmol) was washed with $H_2O$ followed by DMF (5×GV), sucked dry and placed into a Falcon tubes. DMF (10 mL) and $K_2CO_3$ (0.67 g, 4.8 mmol). After 15 min of shaking, EDTA dianhydride (1.24 g, 4.8 mmol) was added. The tube was then placed into a shaking table at 25° C. for 21 hours.

The resin was washed with DMF (3×GV), EtOH (3×GV) and finally with $H_2O$ (5×GV).

To hydrolyze remaining anhydride groups, the resin were slowly washed with 1M NaOH (5×GV) followed by $H_2O$ (>10×GV).

According to nitrogen elemental analysis, the ligand density on the obtained resin was 76 µmol/mL resin.

$Ni^{2+}$-binding capacity measurement was conducted as described in Example 1. $Ni^{2+}$-binding capacity (Qb10%): 71 µmol/mL resin. Total amount of $Ni^{2+}$ in 100 mM EDTA eluate after 2 hours of incubation: 3.2 µmol/mL resin (=4.5% of the capacity).

Examples 4-6 below show the use of the resin obtained in Example 3, for adsorption of histidine-tagged recombinant proteins.

As a person experienced in this field will realise, the exact concentration of ligand and Ni ions on the pentatdentate resin described need not be very critical for the general functional properties (such as the obtained purity and yield of histidine-tagged proteins), but may vary within broad ranges without any large effects on the general behaviour. Likewise, it is readily realised that the general functional properties will not change with a change from the here used matrix SEPHAROSE™ 6 FF, to any other matrix that has the property of not adsorbing any proteins unspecifically.

Example 4

Purification of GFP-(His)$_6$ Using the Adsorbent Obtained in Example 3

The SEPHAROSE™ 6 FF resin obtained in Example 3 was packed in a chromatography column with a bed dimension of 55×5.0 mm (approximately 1 ml).

Sample preparation: After suspending E. coli cells expressing the hexa-histidine tagged protein GFP-(His)$_6$ in an appropriate volume of a suitable lysis buffer containing protease inhibitor, lysates were prepared by lysozyme treatment and sonication on ice, according to common laboratory practice. (GFP=green fluorescent protein; with an absorbance max at 490 nm.). The lysates were clarified by high-speed centrifugation and filtration, giving extracts suitable for chromatography.

At room temperature (20-25° C.) and at a flow rate of 1.0 ml/min, 8 ml of an extract prepared as above, containing 5 mM imidazole, was applied to the column (pre-charged with $Ni^{2+}$ ions). The column had previously been equilibrated with 20 mM sodium phosphate, 500 mM NaCl, 5 mM imidazole, pH 7.4. After washing with 30 ml of the same buffer at 1.5 ml/min, for the removal of unwanted binders, elution at 1 ml/min was accomplished with an imidazole gradient of 5 to 200 mM (16 ml). All buffers were of pH 7.4 and were prepared by on-line mixing from the above equilibration/wash buffer and an elution buffer containing 500 mM imidazole. The chromatography system used was an ÄKTAEXPLORER™.

The gradient of 5-200 mM imidazole accomplished elution of a single peak without any shoulders, having volume-synchronized absorbances at 280 and 490 nm. Samples of consecutive 1-ml fractions of the eluted peak were analysed by SDS-PAGE. Coomassie staining showed in each lane an intense, totally dominant band corresponding to an apparent Mr of approximately 28 000 Da, as expected for GFP-(His)$_6$, with only minor additional bands, some of which may have represented histidine-tagged truncated variants of the target protein. Analysis of the material applied on the column and of the non-bound flow-through material on the same SDS-PAGE gel, showed a very good binding of the target protein. All this demonstrated the high-yield purification of a histidine-tagged protein from a highly complex sample, a clarified *E. coli* lysate.

Example 5

Purification of GFP-(His)$_6$ from 100 ml Insect Cell-Culture Medium Using the Adsorbent Obtained in Example 3

The SEPHAROSE™ 6 FF resin obtained in Example 3 was packed in a chromatography column with a bed dimension of 55×5.0 mm (approximately 1 ml).

Sample preparation: The commercial insect cell-culture medium Ex-Cell 420 (Sigma-Aldrich/SAFC Biosciences), intended for serum-free cultivation, was used. Glutamine and purified GFP-(His)$_6$ (cf. Example 4; absorbance maximum at 490 nm) was added to final concentrations of 2 mM and 1 mg/liter, respectively, to a portion of unused medium. pH was adjusted to 7.1 and the mixture was filtered.

At room temperature (20-25° C.) and at a flow rate of 1.0 ml/min, 100 ml of the above sample was applied to the column (pre-charged with Ni$^{2+}$ ions). The column had previously been equilibrated with 20 mM sodium phosphate, 500 mM NaCl, pH 7.4. After washing with 25 ml of the same buffer at 1.0 ml/min, washing was done with 5 mM imidazole (15 ml), and elution at 1 ml/min was accomplished with an imidazole gradient of 5 to 300 mM (25 ml). All buffers were of pH 7.4 and were prepared by on-line mixing of the above equilibration/wash buffer and an elution buffer containing 500 mM imidazole. The chromatography system used was an ÄKTAEXPLORER™ with a 10-mm spectrophotometer flowcell.

The wash with 5 mM imidazole did not result in any appreciable elution of the target protein (abs. at 490 nm increased by only 0.002). During the imidazole gradient a single peak was eluted, having volume-synchronized absorbances at 280 and 490 nm (abs. at 490 nm was 0.245, the peak width was approx. 12 ml). Samples of consecutive 1-ml fractions of the eluted peak were analysed by SDS-PAGE with coomassie staining and showed the expected excellent purity (for a cell culture sample without serum addition). Analysis of the material applied on the column and of 25-ml fractions of the non-bound sample flow-through material on the same SDS-PAGE gel, showed a very good binding of the target protein, with non-detectable amounts of target protein in the flow-through fractions. All this demonstrated the high-yield capturing of a histidine-tagged protein from a sample known to possess Ni$^{2+}$-desorbing properties when used with tetradentate chelating IMAC resins.

Example 6

Purification of MBP-(His)$_6$ from 300 ml Insect Cell-Culture Medium Using the Adsorbent Obtained in Example 3, and a Commercially Available IMAC resin. Including Determination of the Losses of Ni$^{2+}$ from the Columns The SEPHAROSE™ 6 FF resin obtained in Example 3 was packed in a chromatography column with a bed dimension of 55×5.0 mm (approximately 1 ml). The commercial resin possessed a tetradentate chelating ligand and was used in a 25×7.0 mm column (1 ml). The Ni$^{2+}$ content of the latter was determined to 15.6 μmol/mL resin.

MBP-(His)$_6$, histidine-tagged maltose binding protein, is a protein know to us to bind weaker to Ni-charged IMAC resins than any other histidine-tagged protein that we have studied.

Sample preparation: The commercial insect cell-culture medium Ex-Cell 420 (Sigma-Aldrich/SAFC Biosciences), intended for serum-free cultivation, was used. Glutamine and purified MBP-(His)$_6$ was added to final concentrations of 2 mM and 1 mg/liter, respectively, to a portion of unused medium. pH was adjusted to 7.1 and the mixture was filtered.

At room temperature (20-25° C.) and at a flow rate of 1.0 ml/min, 300 ml of the above sample was applied to the column with the resin obtained in Example 3 (pre-charged with Ni$^{2+}$ ions). The column had previously been equilibrated with 20 mM sodium phosphate, 500 mM NaCl, pH 7.4. After washing with 25 ml of the same buffer at 1.0 ml/min, washing was done with 5 mM imidazole (15 ml), and elution at 1 ml/min was accomplished with an imidazole gradient of 5 to 300 mM (25 ml). All buffers were of pH 7.4 and were prepared by on-line mixing of the above equilibration/wash buffer and an elution buffer containing 500 mM imidazole. The chromatography system used was an ÄKTAEXPLORER™ with a 10-mm spectrophotometer flowcell.

A separate experiment, performed as above and comprising the use of another 300-ml portion of the described sample, was performed with the commercial column.

Analysis of the material applied on the column with pentatdentate resin and of 50-ml fractions of the non-bound flow-through material on the same SDS-PAGE gel, showed a good binding of the target protein, with only small amounts of target protein in the flow-through fractions (estimated to roughly 20-30%). A peak with a width of approximately 15 ml, and a height at 280 nm of ~0.550 was eluted during the gradient. Fractions of the peak showed with SDS-PAGE the expected excellent purity. Analysis by atomic absorption spectrophotometry of the content of Ni$^{2+}$ in the 300 ml sample flow-through from the column showed that a total of 1.3 μmol Ni$^{2+}$ had been lost from the column (=1.8% of the 71 μmol Ni$^{2+}$ present).

With the column with commercial tetradentate resin, analysis of the material applied on the column and of 50-ml fractions of the non-bound flow-through material on the same SDS-PAGE gel, showed that the target protein had not been bound. No peak appeared during the imidazole gradient. Analysis by atomic absorption spectrophotometry of the content of Ni$^{2+}$ in the 300 ml sample flow-through from the column showed that a total of 14.1 μmol Ni$^{2+}$ had been lost from the column (=90% of the 15.6 μmol Ni$^{2+}$ present).

Example 7

Purification of the Integral Membrane Protein RC-(His)$_7$ Using Biomolecule Adsorbents of the Invention Three resins were prepared essentially as described in Example 3, but with SEPHAROSE™ High Performance (HP) instead of SEPHAROSE™ 6 FF. Ni$^{2+}$ binding capacities were determined (as in Example 1) to 62, 46 and 22 µmol/ml resin, respectively. The Ni$^{2+}$-charged resins were packed in chromatography columns with the bed dimensions 25×7.0 mm (approximately 1 ml).

Sample preparation: Cell membranes were prepared by standard procedures from *Rhodobacter sphaeroides* cells that overexpressed a histidine-tagged photosynthetic reaction center, RC-(His)$_7$. The membranes were solubilized with 1% LDAO-detergent (lauryl dimethylamine oxide) and non-solubilized material was removed by ultracentrifugation. For each IMAC purification (below), a 3-ml aliquot of the solubilisate was diluted with 9 ml 10 mM Tris-HCl, 100 mM NaCl, pH 7.8, containing 1% LDAO.

At room temperature (20-25° C.) and at a flow rate of 1.0 ml/min, 12-ml samples prepared as above were applied onto each of the three columns. The columns had previously been equilibrated with 10 mM Tris-HCl, pH 7.8, 0.05% LDAO. After washing with 10 ml of the same buffer at 1.0 ml/min, elution at 1 ml/min was accomplished with an imidazole gradient of 0 to 250 mM (25 ml), and 1-ml fractions were collected. The elution buffer contained also 0.05% LDAO and 10 mM Tris-HCl. The chromatography system used was an ÄKTAEXPLORER™.

With all three columns, fractions of the eluted peaks showed with Coomassie-stained SDS-PAGE excellent purities, i.e., three totally dominating components (bands), comprising the three subunits of the target protein showing the expected apparent molecular weights. The target protein yields were 70-75%, as estimated by doing reference purifications with the very strongly binding IMAC resin Ni SEPHAROSE™ High Performance.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of preparing a biomolecule adsorbent with a pentadentate ligand of the formula

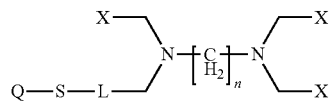

wherein
Q is a carrier
S is a spacer
L is an amide linkage
X is COOH
n = 2 or 3
comprising the following steps:
   providing an alkylene diamine tetraacetic acid dianhydride;
   providing an amino activated carrier;
   coupling said alkylene diamine tetraacetic acid dianhydride to said carrier to form ligands comprised of alkylene diamine triacetic acid linked to said carrier via an amide linkage and a spacer; and
   immobilizing charged metal ion ions by charging the adsorbent so obtained with metal ions, selected from Cu$^{2+}$, Ni$^{2+}$, Zn$^{2+}$, Co$^{2+}$, Fe$^{3+}$ and Ga$^{3+}$ to form pentadentate ligands.

2. The method of claim 1, wherein Q comprises a cross-linked carbohydrate material, selected from agarose, agar, cellulose, dextran, chitosan, konjac, carrageenan, gellan, alginatec.

3. The method of claim 2, in which Q is an amino-activated carbohydrate carrier.

4. The method of claim 3, in which Q is an amino-activated agarose, and n is 2.

5. The method of claim 1, wherein Q comprises cross-linked synthetic polymers, selected from styrene or styrene derivatives, divinylbenzene, acrylamides, acrylate esters, methacrylate esters, vinyl esters, vinyl amides.

6. The method of claim 1, wherein the alkylene diamine tetraacetic acid dianhydride is EDTA dianhydride.

7. The method of claim 1, wherein the spacer comprises at least 3 atoms.

8. The method of claim 1, wherein Q comprises magnetic particles.

* * * * *